United States Patent [19]

Taig

[11] Patent Number: 4,877,113
[45] Date of Patent: Oct. 31, 1989

[54] ONE-WAY CLUTCH PREVENTING BACK DRIVE OF REVERSIBLE MOTOR

[75] Inventor: Alistair G. Taig, Edwardsburg, Mich.

[73] Assignee: Allied-Signal Inc., Morristown, N.J.

[21] Appl. No.: 298,604

[22] Filed: Jan. 18, 1989

Related U.S. Application Data

[62] Division of Ser. No. 183,129, Apr. 19, 1988, Pat. No. 4,836,338.

[51] Int. Cl.⁴ ............................................. F16D 55/16
[52] U.S. Cl. .............................. 188/82.84; 188/72.1; 188/72.8; 192/8 R
[58] Field of Search .............. 188/82.84, 82.8, 71.1, 188/134, 71.2, 30, 61, 69, 72.8, 72.7, 72.1; 192/8 R, 7, 45, 44; 74/805, 781 R

[56] References Cited

U.S. PATENT DOCUMENTS

| | | | |
|---|---|---|---|
| 1,899,834 | 2/1933 | Thomas et al. | 192/44 |
| 1,964,146 | 6/1934 | Fishburn et al. | 192/44 X |
| 2,060,376 | 11/1936 | Jex | 188/82.84 X |
| 2,212,731 | 8/1940 | Dunn | 192/44 X |
| 2,228,888 | 1/1941 | Rock | 192/440 |
| 2,240,043 | 4/1941 | Kinser | 192/8 R |
| 2,259,473 | 10/1941 | Johnson | 192/44 |
| 2,583,428 | 1/1952 | Houplain | 192/8 R |
| 2,626,027 | 1/1953 | Anderson | 192/8 R |
| 3,774,571 | 11/1973 | Shimanckas | 192/8 R |
| 3,902,377 | 9/1975 | Lemor | 74/459 |
| 3,961,541 | 6/1976 | Fund et al. | 74/459 |
| 4,166,226 | 8/1979 | Estkowski | 192/8 R |
| 4,266,635 | 5/1981 | Kondo | 188/82.84 |
| 4,381,049 | 4/1983 | Crossman | 188/72.7 |
| 4,597,477 | 7/1986 | Miller | 188/134 X |
| 4,620,621 | 11/1986 | Kulczycki et al. | 192/44 X |
| 4,658,939 | 4/1987 | Kircher et al. | 188/156 |
| 4,697,676 | 10/1987 | Haake | 192/8 R |
| 4,705,148 | 11/1987 | Zindler | 192/8 R |
| 4,706,791 | 11/1987 | Magliano | 192/8 R |
| 4,793,447 | 12/1988 | Taig et al. | 188/72.1 |
| 4,836,338 | 6/1989 | Taig | 188/72.1 |

FOREIGN PATENT DOCUMENTS 45271 9/1934 France ........................ 188/82.84
2337285 9/1977 France .

Primary Examiner—Douglas C. Butler
Attorney, Agent, or Firm—Larry J. Palguta; Ken C. Decker

[57] ABSTRACT

The electrically operated disc brakes (10, 210) may include a high efficiency screw and nut mechanism (60) and/or a one-way clutch mechanism (230). The high efficiency screw and nut mechanism (60) includes a screw (86) with a screw thread (89) that has a predetermined pitch, and at least one nut (77, 97) disposed about the screw (86) and having an interior opening (78, 98) with a nut thread (79, 99) therein. The pitch of the nut thread (79, 99) is equal to the pitch of the screw thread (89), and the pitch diameter of the nut thread (79, 99) is greater than the pitch diameter of the screw thread (89). The screw (86) is driven by the electric motor (40) of the disc brake (10, 210). The one-way clutch mechanism (230) includes a sun gear drive member (252) which has oppositely disposed radial drive slots (257) through which extends a drive pin (243) that extends transversely through the drive shaft (241) of the electric motor (240). The sun gear drive member (252) is journalled within a cage member (281) which has oppositely disposed radial cage slots (282) into which extends the drive pin (243). The radial cage slots (282) are in circumferential non-alignment with the radial drive slots (257) of the sun gear drive member (252). The sun gear drive member (252) includes cam surfaces (253) receiving roller bearings (290) thereat, the roller bearings (290) extending through oppositely disposed openings (284) within the cage member (281) to engage an interior surface (297) of an annular housing (295). The clutch mechanism (230) permits the sun gear drive member (252) to be rotated in both directions by the drive shaft (241), but when reaction forces attempt to reverse rotation of the drive member (252) and electric motor (240), the clutch mechanism (230) locks and prevents such reverse rotation.

9 Claims, 2 Drawing Sheets

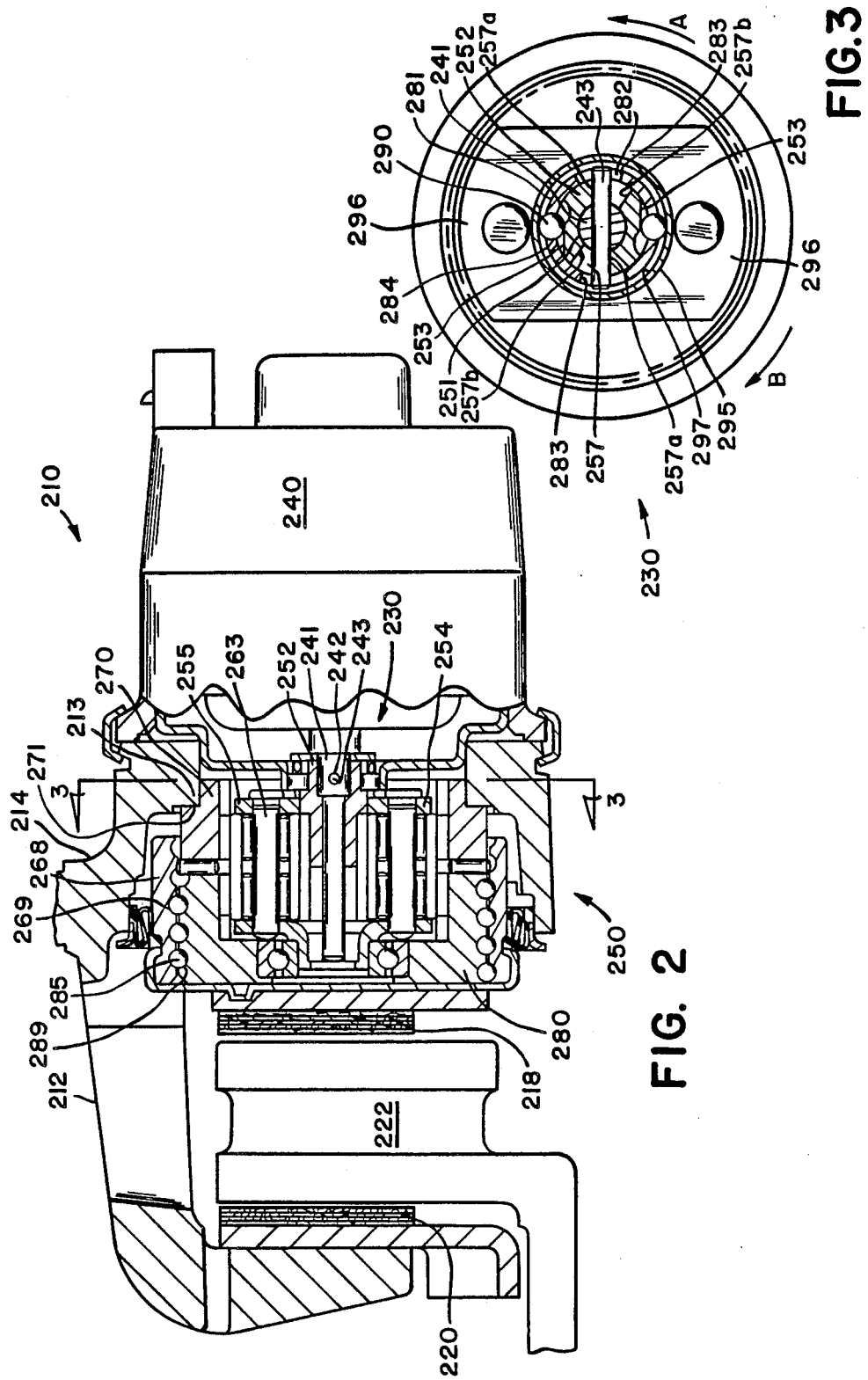

ONE-WAY CLUTCH PREVENTING BACK DRIVE OF REVERSIBLE MOTOR

This is a divisional of application Ser. No. 183129 filed Apr. 19, 1988, now U.S. Pat. No. 4,836,338 issued June 6, 1989.

This invention relates generally to disc brakes that may be operated electrically, and in particular to an electrically operated disc brake containing a high efficiency screw and nut mechanism and/or a one-way clutch mechanism having a unique release feature.

Disc brakes have been utilized for many years in passenger cars, heavy trucks, and aircraft. Because of the increasing emphasis on reducing the weight of vehicles and simplifying the components thereof, it is desirable to develop a braking system that is operated electrically. Such a braking system must be highly reliable, cost effective, and practical within the packaging constraints of the particular vehicle. The present invention provides a disc brake that may be operated by an electric motor and which may contain a highly efficient nut and screw mechanism and/or a one-way clutch mechanism having a unique release feature. The high efficiency screw and nut mechanism provides a simplified structure that is highly reliable, low cost, and which will fit readily within the packaging constraints of several vehicles that may utilize an electrically operated disc brake. Likewise, the one-way clutch mechanism with unique release feature provides a highly reliable, low cost clutch mechanism which enables the disc brake to meet Federal requirements for vehicle parking brakes, while at the same time being small enough so that the overall size of the electrically operated disc brake will continue to fit readily within the packaging constraints of several vehicles.

The present invention comprises a screw having a screw thread about the circumference thereof, the screw thread having a predetermined pitch, a nut disposed about said screw and having an interior opening, the interior opening having a nut thread which engages at a circumferential portion thereof the screw thread, the nut thread having a pitch equal to the pitch of the screw thread, the screw thread having a predetermined pitch diameter and the nut thread having a predetermined pitch diameter, the pitch diameter of the nut thread being greater than the pitch diameter of the screw thread, whereby rotation of the screw causes said nut to rotate at a different rotational speed relative to the rotational speed of the screw. The present invention may be utilized in a disc brake comprising a caliper having a bore and a piston housing actuatable to displace a pair of friction elements into engagement with a rotor, motor means for actuating operatively a high efficiency screw and nut mechanism, the screw and nut mechanism effective to displace axially said piston housing and cause the displacement of the pair of the friction elements, the screw comprising a screw thread having a predetermined pitch and a predetermined pitch diameter, a first nut disposed about said screw and having an interior opening with a nut thread disposed therein, the nut thread engaging at a circumferential portion thereof the screw thread, the nut thread having a pitch equal to the predetermined pitch of the screw thread, and the nut thread having a predetermined pitch diameter greater than the predetermined pitch diameter of the screw thread, whereby rotation of said screw by the motor means effects rotation and axial displacement of said first nut to effect said axial displacement of the piston housing. The present invention also comprises a clutch mechanism which includes a drive shaft having a drive pin extending transversely therefrom, the drive shaft and drive pin disposed within a drive member, the drive member having therein a pair of oppositely disposed radially extending drive slot, the drive pin extending radially through said drive slots, the drive member having cam surfaces about the periphery thereof receiving bearing means thereat, a cage member disposed about said drive member and having oppositely disposed radial cage slots, the drive pin extending radially into said radial cage slots, the radial cage slots being in circumferential non-alignment with said drive slots, and a housing disposed about said cage member and having an interior surface engaged by said bearing means.

The invention is described in detail below with reference to the drawings which illustrate embodiments in which:

FIG. 2 is a section view of an electrically operated disc having a one-way clutch mechanism with unique release feature; and FIG. 3 is a section view taken along view line 3—3 of FIG. 2.

Figure 1:
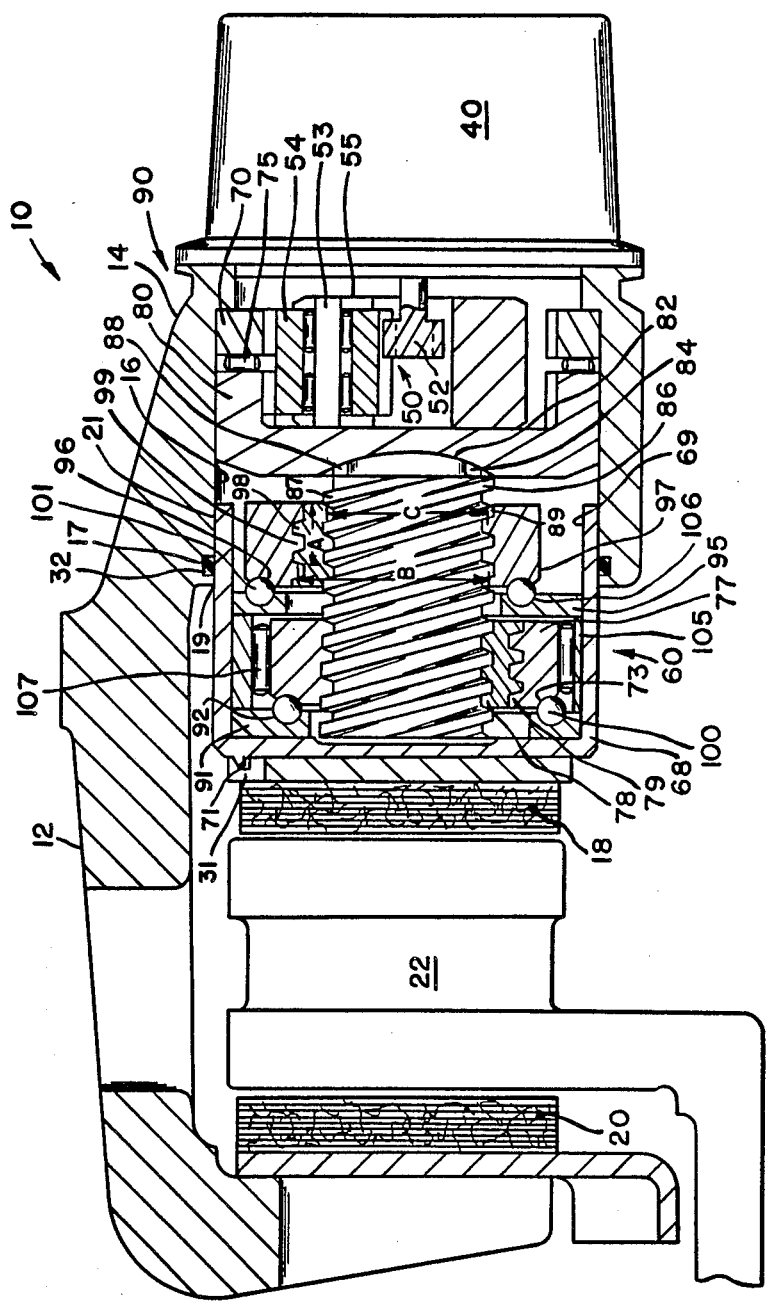
FIG. 1 is a section view of an electrically operated disc brake having a high efficiency screw and nut mechanism.

A disc brake of the present invention is referenced generally by numeral 10 in FIG. 1. Disc brake 10 comprises a brake that is operated by motor means 40. Motor means 40 may comprise an electric motor or other motor mechanisms that provide a rotary output via shaft 41. Disc brake 10 includes a caliper 12 having a caliper housing 14 with a bore 16. Caliper 12 extends over a pair of friction elements 18 and 20 which may be displaced toward one another in order to brake a rotor 22. The bore 16 comprises a groove 17 adjacent opening 19 and bore end 21. Seal 32 is disposed within groove 17. Located within bore 16 s an actuating mechanism referenced generally by numeral 90. Actuating mechanism 90 comprises a planetary gear assembly 50 which includes a sun gear 52, three planetary gears 54 (the other two not shown in the section view), a carrier 55, pins 53 which carry the planetary gears, two ring gears 70, 80, and thrust bearings 75. Each ring gear has internal teeth, the ring gear 80 being rotatable but having fewer teeth than ring gear 70 which is operatively coupled with caliper housing 14. The planetary gear assembly 50 comprises the planetary gear assembly disclosed in U.S. Pat. No. 4,793,447 entitled "Electrically Operated Disc Brake" which is incorporated by reference herein. Because the two ring gears 70 and 80 have different numbers of teeth, the planetary gear assembly has a high reduction ratio, as disclosed in U.S. Pat. No. 4,793,447. Rotatable ring gear 80 has a recess 82 with splines 84 therein. A screw 86 includes a first end 87 having splines 88 which engage the splines 84 of rotatable ring member 80 and thereby couple together nonrotatably the screw 86 and ring member 80. First end 87 and recess 82 are curved so that the screw may self-center itself relative to ring gear 80. Located within bore 16 is a piston housing 68 which has an interior opening 69. Piston housing 68 includes a key 71 received within slot 31 of friction element 18 so that the two are coupled nonrotatably together. The high efficiency screw and nut mechanism is referenced generally by numeral 60. Disposed about screw 86 is at least one nut 77. Nut 77 has an interior opening 78 containing a nut thread 79. Nut thread 79 engages, at a circumferential portion thereof, a screw thread 89. The nut 77 includes a bearing race 73 which receives ball bearings 100. Located at the closed end of piston housing 68 is a bearing race member 91 which includes a bearing race 92 that receives the bearings 100. Second nut 97 includes an interior opening 98 having a second nut thread 99 which engages at a circumferential portion thereof the screw thread 89. Second nut 97 includes a race 96 which receives bearing members 101 that are seated within the correspondingly shaped race 106 of thrust race member 95. Thrust race member 95 abuts a sleeve 105 that also abuts at the other end the bearing race member 91. Disposed between nut 77 and sleeve 105 is a needle type clutch 107. Clutch 107 permits nut 77 to rotate freely in only direction of rotation but eliminating, absent rotation of the screw, rotation of the nut in the other direction.

It is desirable to use a highly efficient screw and nut mechanism which, in at least one direction of rotation, minimizes as much as possible the frictional contact between threads 89 of screw 86 and nut threads 79, 99. In order to accomplish this, screw threads 89 and nut threads 79, 99 have the same pitch (see Distance A). However, the pitch diameter of nuts 77, 97 (as indicated by Distance B on nut 97) is slightly greater than the pitch diameter C of screw 86. Thus, the pitch diameters of nuts 77 and 97 may be equal to each other or slightly different, but the pitch diameters of both nuts are at least slightly greater than the pitch diameter of screw 86, which results in the rotation of nuts 77, 97 at a speed different than the rotation of screw 86. Nut 97 engages bearings 101 that engage the thrust race member 95, and thrust race member 95 engages sleeve 105 in order to transmit thrust to the bearing race member 91 and piston housing 68. As nuts 77, 97 advance axially and slowly along screw 86, the nuts engage the respective bearings 100, 101. A balancing of the mechanism is accomplished by bearings 100 and 1012 being offest and the threads 79 and 99 engaging opposite radial sides of screw thread 89.

The electric motor 40, in response to signals from a controller (not shown), drives sun gear 52 of planetary gear mechanism 50. As planetary gear mechanism 50 effects the rotation of rotatable ring gear 80, rotatable ring gear 80 rotates screw 86 which, through the difference in pitch diameters B and C, causes nuts 77,97 to rotate and advance slowly along screw thread 89. Then substantial advantage of the present invention is that circumferential sliding friction between the screw and nuts is virtually eliminated, and only low velocity radial sliding will occur at the screw and nuts rotate together. A very high mechanical efficiency is achieved so that a fully reversible action is possible, and is thus suitable for a service brake actuator. It is desirable to provide a mechanism that may be utilized as a parking brake mechanism wherein the same high efficiency can be achieved to apply the brake, but a low efficiency in the reverse drive direction be provided in order to allow the actuator to hold in its applied position until reverse motor torque is effected. To accomplish this, the needle type clutch 107 allows nut 77 to rotate freely in one direction, but prevents and eliminates any free rotation of the nut in the reverse direction of rotation. Thus, in order to release disc brake 10, screw 86 must be rotated in the reverse direction in order to cause sliding between screw 86 and nut 77, 97. By suitable selection of the pitch of the threads of the screw and nuts, the brake mechanism can be made irreversible, all without affecting the application efficiency of the brake. Because the differential screw and nut mechanism is utilized in order to advance the nut or nuts slowly along the screw thread, a lower ratio reduction gear box may be utilized for the driving of the screw. The screw 86 functions like a fine pitch screw but without the high frictional losses associated with fine pitch screw threads.

FIGS. 2 and 3 illustrate an embodiment in which the disc brake is referenced generally by numeral 210. Similar structure will be indicated by the same reference numeral increased by 200. The electric motor 240 drives a planetary gear assembly 250 which is housed within the caliper housing 214 of caliper 212. The planetary gear assembly 250 includes a sun gear drive member 252 which drives a carrier 255, pins 263, and planetary gears 254. The fixed ring gear 270 nonrotatably engages the caliper housing 214 by means of the housing shoulder 213 received within the gear recess 271. Rotatable ring gear 280 includes a helical groove 289 with bearing balls 285 disposed therein and engaging helical grooves 269 of the actuator sleeve 268. The structure of the planetary gear assembly 250, ring gears 270 and 280, and actuator sleeve 268 is similar to that disclosed in copending Patent Application Ser. No. 105,756 entitled "*Electrically Actuated Disc Brake*" which is incorporated by reference herein. The ring gears have a tooth differential, with rotatable ring gear 280 having fewer teeth than ring gear 270, so that planetary gear assembly 250 provides a high reduction ratio.

The one-way clutch mechanism with unique release feature is designated generally by reference numeral 230. Electric motor 240 includes a motor drive shaft 241 that includes transverse opening 242 (see FIG. 2). Transverse opening 242 receives therein a drive pin 243. Drive pin 243 is also received within the sun gear drive member 252 (see FIG. 3). Sun gear drive member 252 has a bore 251 which receives the motor drive shaft 241. Sun gear drive member 252 includes oppositely disposed radial drive slots 257 which have abutment edges 257a and 257b. Drive member 252 is journalled within a cage member 281. Cage member 281 includes oppositely disposed radial cage slots 282 which have abutment surfaces 283. Cage member 281 also includes oppositely disposed radial openings 284. About the periphery of sun gear drive member 252 are cam surfaces 253 which receive roller bearings 290. Roller bearings 290 extend through radial openings 284 of cage member 281. Drive pin 243 extends through the radial drive slots 257 and into the radial cage slots 282. Drive slots 257 are in circumferential nonalignment with the radial cage slots 282. Disposed about cage member 281 is an annular housing 296 which extends into radially extending flange portions 296 that are fixed to caliper housing 214. The interior surface 297 of housing 295 is engaged by roller bearings 290. Planetary gear assembly 250 is driven by electric motor 240 via the one-way clutch mechanism 230 which prevents a back drive of the motor by mechanism 250. A reversal of the electric motor direction of rotation automatically unlocks clutch mechanism 230 and allows release rotation of drive shaft 241 as long as electric motor 240 is turning drive shaft 241. The circumferential nonalignment of the cage slots 282 and drive slots 257 results in the cage member 281 not being rotated by the drive pin 243 during rotation of drive pin 243 in an application direction (Arrow A), so that when the motor 240 rotates pin 243 in a reverse direction (Arrow B) pin 243 engages an rotates cage member 281 to release bearings 290 from a locked position before pin 243 engages and rotates drive member 252 in the reverse or release direction of rotation. Clutch mechanism 230 may be used in place of the one-way roller clutch 107 illustrated in the electric disc brake of FIG. 1. The utilization of clutch mechanism 230 to prevent back-off of the brake mechanism allows high efficiency screw mechanisms such as those described above to be used with a consequent savings in motor power and the sizes of component parts.

When motor 240 operates and rotates motor shaft 241 in the counterclockwise direction (see Arrow A in FIG. 3), drive pin 243 engages abutment surfaces 257a of sun gear drive member 252 (as illustrated) and causes roller bearings 290, as member 252 rotates relative to cage member 281, to move to the deep ends of cam surfaces 253 where there is sufficient radial clearances to prevent jamming of roller bearings 290 between the interior surface 297 of housing 295 and cam surfaces 253. Thus, motor 240 can drive sun gear drive member 252 in a counterclockwise direction and effect operation of planetary gear assembly 250 and axial displacement of friction element 218 into engagement with rotor 222 and, by reaction, the axial displacement of friction element 220 into engagement with the other face of rotor 222. When electric current to motor 240 is terminated, reaction forces cause the actuator sleeve 268 and rotatable ring member 280 to turn sun gear drive member 252 in a clockwise direction. Drive member 252 can rotate slightly in the clockwise direction (see Arrow B) until roller bearings 290 ride up cam surfaces 253 and move radially outwardly so that they become wedged between cam surfaces 253 and interior surface 297 of housing 295. Thus, sun gear drive member 252 cannot drive back motor 240 and brake 210 remains mechanically locked in the applied position. If electric motor 240 receives a signal which requires rotation of drive member 252 in the clockwise direction (Arrow B), motor 240 initially rotates pin 243 relative to drive member 252, drive shaft 241 being journalled within bore 251 of the drive member 252. Drive pin 243 rotates in the clockwise direction within radial cage slots 282 and radial slots 257 such that the drive pin engages abutment surfaces 283 of cage member 281 before the pin ever engages abutment surfaces 257b of drive member 252. This causes cage member 281 to rotate relative to member 252, the rotation of cage member 281 causing roller bearings 290 to rotate in the clockwise direction and move into the radially recessed portions of cam surfaces 253. This effects an unlocking of drive member 252 relative to housing 295, and drive member 252 can be driven in the clockwise direction as pin 243 then engages surface 257b, and continuously driven as long as electric motor 240 is rotating drive shaft 241. When motor 240 terminates its rotation of drive shaft 241, roller bearings 290 can immediately reengage the radially outer portions of cam surfaces 253 and become wedged between the radially outer portions of the cam surfaces and interior surface 297 of fixed housing 295. This locks sun gear drive member 252 relative to fixed housing 295. Thus, electric motor 240 is utilized to apply and release brake 210, and with only minimal electric power utilized for release of the brake. The one-way clutch mechanism 230 with unique release feature can be utilized equally well for a service or parking brake application and has the advantage of utilizing high motor power only when the braking force is being increased. When steady braking is occurring, the clutch mechanism 230 will remain applied and no further motor power is needed. Motor power need only be applied in order to either apply the brake further or to effect a release of the brakes via a release of the clutch mechanism.

The one-way clutch mechanism with unique release feature enables the brake to be highly efficient for either parking or service brake applications, and with a consequent savings in energy requirements for actuation. The drive motor is able to control both the application and release of the brake. The one-way clutch mechanism operated by the motor is very compact, and has a low cost.

While the invention has been described with respect to the detailed embodiments, it will be understood that the invention is capable of numerous rearrangements, modifications, and alterations, and such are intended to be within the scope of the appended claims. It is reasonably to be expected that those skilled in the art can make numerous revisions and additions to the invention and it is intended that such revisions and additions will be included in the scope of the following claims as equivalents of the invention.

I claim:

1. A one-way clutch mechanism which prevents the back drive of a reversible motor, comprising a drive shaft having a drive pin extending transversely therefrom, the drive shaft and drive pin disposed within a drive member, the drive member having therein a pair of oppositely disposed radially extending drive slots, the drive pin extending radially through said drive slots and for engaging and rotating the drive member in one direction of rotation, the drive member having cam surfaces about the periphery thereof receiving bearing means thereat, a cage member disposed about said drive member and having oppositely disposed radial cage slots, the drive pin extending radially into said radial cage slots, the radial cage slots being in circumferential nonalignment with said drive slots, and a housing disposed about said cage member and having an interior surface engaged by said bearing means, so that rotation in an opposite direction of the drive pin by the drive shaft results in the drive pin engaging and rotating the cage member to release the bearing means from engagement between the interior surface and cam surfaces before the drive pin engages and rotates the drive member in the opposite direction.

2. The clutch mechanism in accordance with claim 1, wherein the cam surfaces are disposed radially inwardly of an outer peripheral surface of said drive member.

3. The clutch mechanism in accordance with claim 1, wherein the housing is a non-rotatably fixed annular housing, the housing extending into a radial flange.

4. The clutch mechanism in accordance with claim 1, wherein the drive shaft comprises the drive shaft of an electric motor, and the drive pin extends through a diametral opening within the drive shaft.

5. The clutch mechanism in accordance with claim 1, wherein the bearing means comprise a plurality of roller bearings.

6. The clutch mechanism in accordance with claim 1, wherein the cage member includes oppositely disposed openings through which extends the bearing means.

7. The clutch mechanism in accordance with claim 1, wherein the drive member includes an interior bore in which is rotatably received the drive shaft, and the cage member includes an interior opening in which is rotatably journalled the drive member.

8. The clutch mechanism in accordance with claim 1, wherein the drive member comprises a sun gear of a planetary gear mechanism.

9. The clutch mechanism in accordance with claim 8, further comprising braking means which includes the sun gear which is operated by motor means, engagement of the bearing means between the interior surface and cam surfaces preventing the sun gear from being rotated in the opposite direction of rotation by the planetary gear mechanism wherein the braking means is placed in a mechanically locked position.

* * * * *